United States Patent
Daniels et al.

(10) Patent No.: US 7,921,704 B2
(45) Date of Patent: Apr. 12, 2011

(54) VIRTUAL FLEX FUEL SENSOR FOR SPARK IGNITION ENGINES USING IONIZATION SIGNAL

(75) Inventors: Chao Fu Daniels, Ypsilanti, MI (US); Guoming George Zhu, Novi, MI (US); William Charles Mammen, Jr., White Lake, MI (US); Mengyang Zhang, Troy, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 312 days.

(21) Appl. No.: 12/241,807

(22) Filed: Sep. 30, 2008

(65) Prior Publication Data

US 2010/0077834 A1 Apr. 1, 2010

(51) Int. Cl.
*G01M 15/04* (2006.01)
(52) U.S. Cl. ............... 73/114.67; 73/23.31; 73/35.08; 73/114.55
(58) Field of Classification Search .......... 73/35.08, 73/114.55, 114.67
See application file for complete search history.

(56) References Cited

U.S. PATENT DOCUMENTS

| | | | | |
|---|---|---|---|---|
| 4,920,494 A * | 4/1990 | Abo et al. | ...................... | 701/104 |
| 5,510,715 A * | 4/1996 | Takeuchi | ..................... | 324/391 |
| 5,544,635 A * | 8/1996 | Hara et al. | ............... | 123/406.26 |
| 6,371,078 B1 * | 4/2002 | Kondo et al. | ................. | 123/305 |
| 6,614,230 B2 * | 9/2003 | Raichle et al. | ................ | 324/399 |
| 7,168,300 B2 * | 1/2007 | Kawanishi et al. | .......... | 73/61.46 |
| 7,213,573 B2 * | 5/2007 | Daniels et al. | ........... | 123/406.28 |
| 7,251,571 B2 * | 7/2007 | Zhu et al. | ......................... | 702/64 |
| 7,290,442 B2 * | 11/2007 | Zhu et al. | .................... | 73/114.67 |
| 7,318,411 B1 * | 1/2008 | Zhu et al. | ................. | 123/406.26 |
| 7,469,574 B2 * | 12/2008 | Kawanishi et al. | .......... | 73/61.46 |
| 7,690,352 B2 * | 4/2010 | Zhu et al. | ................. | 123/406.14 |
| 2008/0270005 A1 * | 10/2008 | Tooyama | ...................... | 701/103 |
| 2009/0251302 A1 * | 10/2009 | Cunningham et al. | ........ | 340/438 |
| 2009/0260419 A1 * | 10/2009 | Maeda et al. | ................ | 73/23.32 |
| 2009/0281708 A1 * | 11/2009 | Loeffler et al. | ............... | 701/103 |
| 2009/0306875 A1 * | 12/2009 | Jiang et al. | ..................... | 701/102 |

* cited by examiner

*Primary Examiner* — Freddie Kirkland, III
(74) *Attorney, Agent, or Firm* — Dickinson Wright PLLC

(57) ABSTRACT

Alcohol concentration level of flex fuel is estimated based upon in-cylinder ionization signals. The in-cylinder ionization signals are integrated and the rotational completion point of a chosen percentage of the integration total is identified as the integration location for the operating conditions under observation. The calculated integration location correlates with alcohol concentration level of flex fuel, and the integration calculations provide a basis for a virtual flex fuel sensor that provides calculated estimates of alcohol concentration rather than direct sensing using an expensive physical flex fuel sensor.

4 Claims, 8 Drawing Sheets

VIRTUAL FLEX FUEL SENSOR FOR SPARK IGNITION ENGINES USING IONIZATION SIGNAL

TECHNICAL FIELD

This invention relates generally to flexible fuel vehicles and, more particularly, to dynamic determination of the relative mix of fuel types being supplied to a flexible fuel engine.

BACKGROUND INFORMATION

A flexible fueled vehicle (FFV) has a single fuel tank, fuel system, and engine. The vehicle is designed to run on unleaded gasoline and an alcohol fuel (usually ethanol) in any mixture. The engine and fuel system in a FFV must be adapted slightly to run on alcohol fuels because they are corrosive. A special sensor (called a flex fuel sensor) in the fuel line of the FFV analyzes the fuel mixture and control the fuel injection and timing to adjust for different fuel compositions. The FFV offers its owner an environmentally beneficial option whenever an alternative (i.e., blended) fuel is available.

The Powertrain Control Module (PCM) of a FFV is able to adjust engine fuel control and ignition timing to match the percentage of ethanol/methanol (alcohol) content in the fuel. Common names for these commercially available fuels are E-22 for methanol fuel and E-85, which stands for up to 85 percent ethanol. The flex fuel (FF) sensor measures the percentage of alcohol and sends a signal to the PCM. Since the energy density of alcohol is much lower than gasoline and the mass fraction burned rate is much faster than gasoline, the PCM adjusts fuel/air mixture and spark advance timing to ensure power output is close to that of a normally fueled engine.

For a conventional FF sensor, the output frequency increases as the percentage of ethanol/methanol in the fuel mixture increases. For example, a fuel blend that is 30 percent methanol has an FF sensor signal output frequency between 60 and 100 Hz, and a 60 percent methanol blend will have an FF sensor frequency between 90 and 130 Hz. The PCM uses this frequency input to calculate the correct air/fuel ratio and spark advance for the vehicle. Regular 87 octane or 88 octane gasoline will yield a 40-60 Hz FF sensor output frequency.

One disadvantage of the conventional FF sensors is that they are expensive and, thus, drive up the cost of manufacture of a FFV hundreds of dollars in comparison with a similar gasoline-fueled vehicle. Thus, it is desirable to find a cheaper way to sense the degree of alcohol/gasoline blend in fuel provided the engine of a FFV.

SUMMARY OF THE INVENTION

Spark ignited engine ionization signal detected during the combustion process provides both diagnostics and combustion information for closed loop control. The mix of fuels being burned in a combustion chamber is dynamically detected based on an ionization signal sensed in the combustion chamber. Ionization signal detection is realized using the spark plug as a sensing element. An estimated percentage of alcohol in the fuel is calculated from the detected ionization signal, and the estimate is used in the engine's PCM for adjusting fuel injection quantity and spark timing The Powertrain Control Module (PCM) of a FFV has the capability to adjust engine fuel control and timing to be appropriate to the percentage of ethanol/methanol (alcohol) content in the fuel. Rather than using a conventional flex fuel sensor in the fuel line to analyze the fuel mixture embodiments of the present invention provide a fuel content feedback signal to PCM based upon in-cylinder ionization.

According to one embodiment, a flex fuel mixture estimation algorithm arrives at an estimation based upon the shape of the in-cylinder ionization signal.

Embodiments of the present invention use an in-cylinder ionization signal to provide an estimated flexible fuel mixture (percentage of alcohol level) for a PCM to regulate the fuel/air mix and spark timing for different fuel compositions.

These and other features and advantages of this invention will become more apparent to those skilled in the art from the detailed description of a preferred embodiment. The drawings that accompany the detailed description are described below.

DETAILED DESCRIPTION

Estimating fuel mix composition based upon the shape of the ionization signal provides for a robust approach that is not affected by ionization signal variations that are caused by spark plug aging, spark plug gap size, spark plug resistance, ignition coil variations, etc.

In a homogeneous charge spark ignition (HCSI) internal combustion engine (traditionally known as a gasoline engine), combustion starts at one (or optionally a few) electrical discharge point(s) and propagates through a premixed homogeneous charge of air and fuel. Parameters of the burn can be ascertained by sensing the ionization that occurs in the cylinder during the burn.

An ionization detection system uses a spark plug as a sensor to observe in-cylinder combustion process when a bias voltage is applied between the spark plug's center and ground electrodes. When the engine uses spark ignition, the flame starts at the spark plug gap and gradually moves away, and the ionization signal can provide more detailed information about in-cylinder combustion than an in-cylinder pressure signal. In fact, when the engine load is high enough, the ionization signal can be used to identify timing of the in-cylinder pressure peak.

Figure 1:
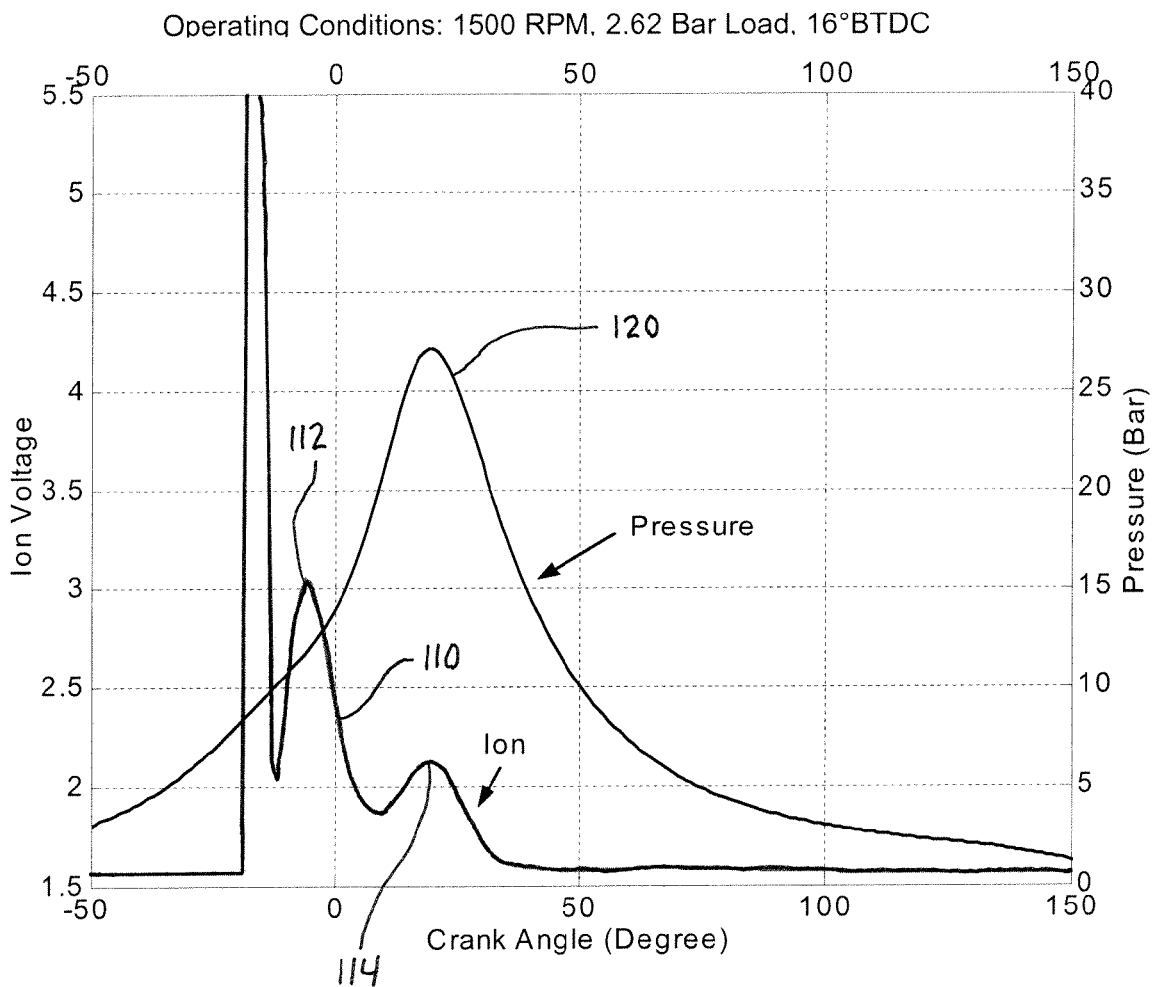
FIG. 1 illustrates a plot of a typical ionization signal in a spark ignition combustion mode.

Referring to FIG. 1, an ionization signal 110 and the corresponding in-cylinder pressure signal 120 are shown for a two-liter four-cylinder engine operating at 1500 RPM with 2.62 Bar BMEP. As is typical of an ionization signal for an engine running in spark ignition combustion mode the illustrated ionization signal 110 has two peaks 112, 114. The first peak 112 is due to the initial flame kernel development right after the spark. When the flame front leaves the spark plug, the magnitude of the ionization signal reduces. As the pressure 120 in the cylinder increases rapidly, the combusted mixture around the spark plug gap is ionized again due to the high temperature resulted from the combustion, that generates the second peak 114.

Figure 2:
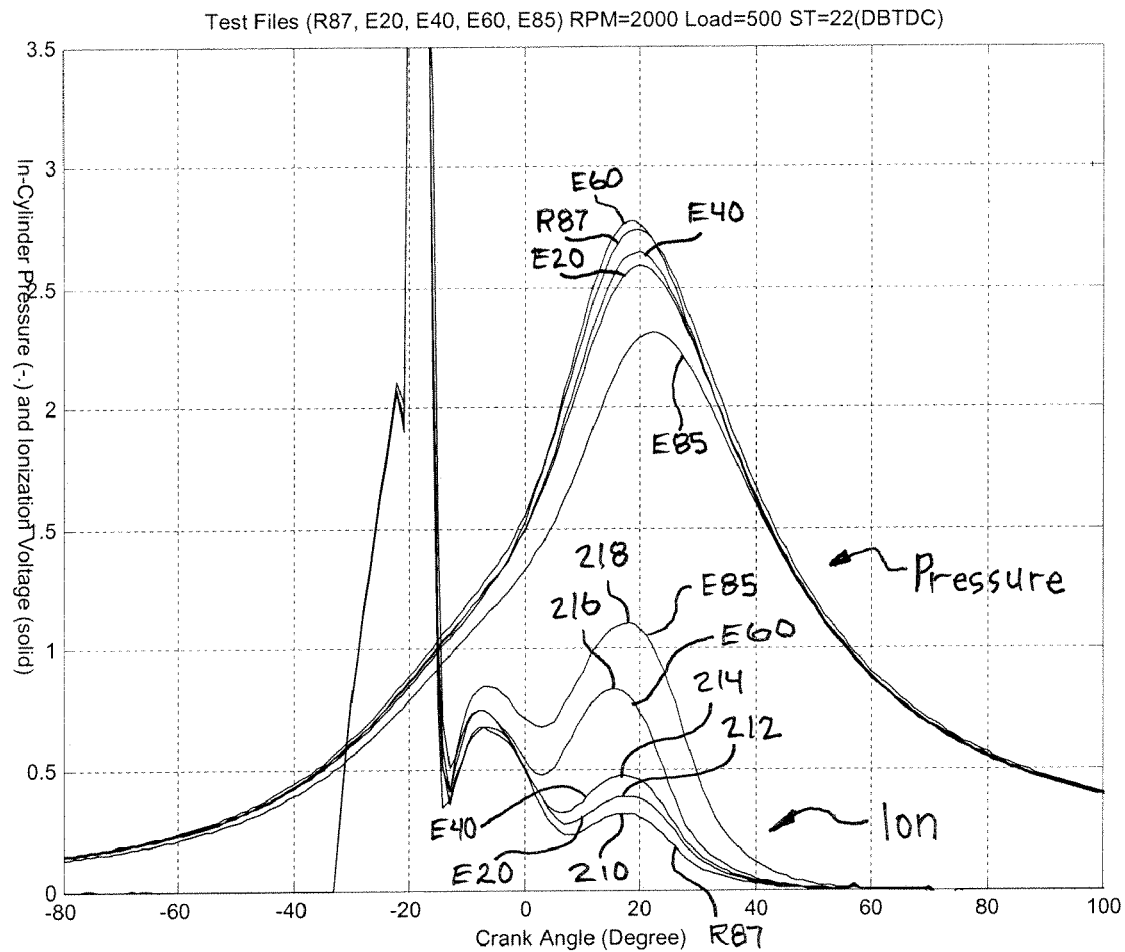
FIG. 2 illustrates a plot of ionization signals with different ethanol levels.

For a fixed operational condition (fixed RPM, load, and ignition timing, the ionization signals vary as a function of fuel types. Referring to FIG. 2, the in-cylinder ionization signals 210, 212, 214, 216, 218 with different ethanol (alcohol) concentrations (0, 20, 40, 60, and 85 percent) are plotted together to illustrate their differences. Due to the fact that the flame temperature increases as the fuel's alcohol content increases, the magnitude of the second peak of the ionization signals increase in correspondence with the fuel's alcohol content.

Thus, the ionization signal does vary as a function of fuel alcohol concentration. However, the ionization signal also varies as a function of other things, including engine aging, spark plug aging, and so on. To provide a robust estimate of the alcohol content of the supplied fuel, unaffected by variations due to engine aging, spark plug aging, and other factors, an algorithm is needed that extracts from ionization signals an estimate that varies consistently with fuel alcohol content and nothing else.

The present invention takes advantage of the observation that although the ionization signal varies due to engine aging, spark plug aging, and so on, those variables do not alter the shape of the ionization signal. On the other hand the shape of the ionization signal does vary with fuel content. A shape-based criterion for estimating alcohol concentration has been found to provide a robust estimation with respect to engine aging, spark plug aging, and other factors.

Figure 3:
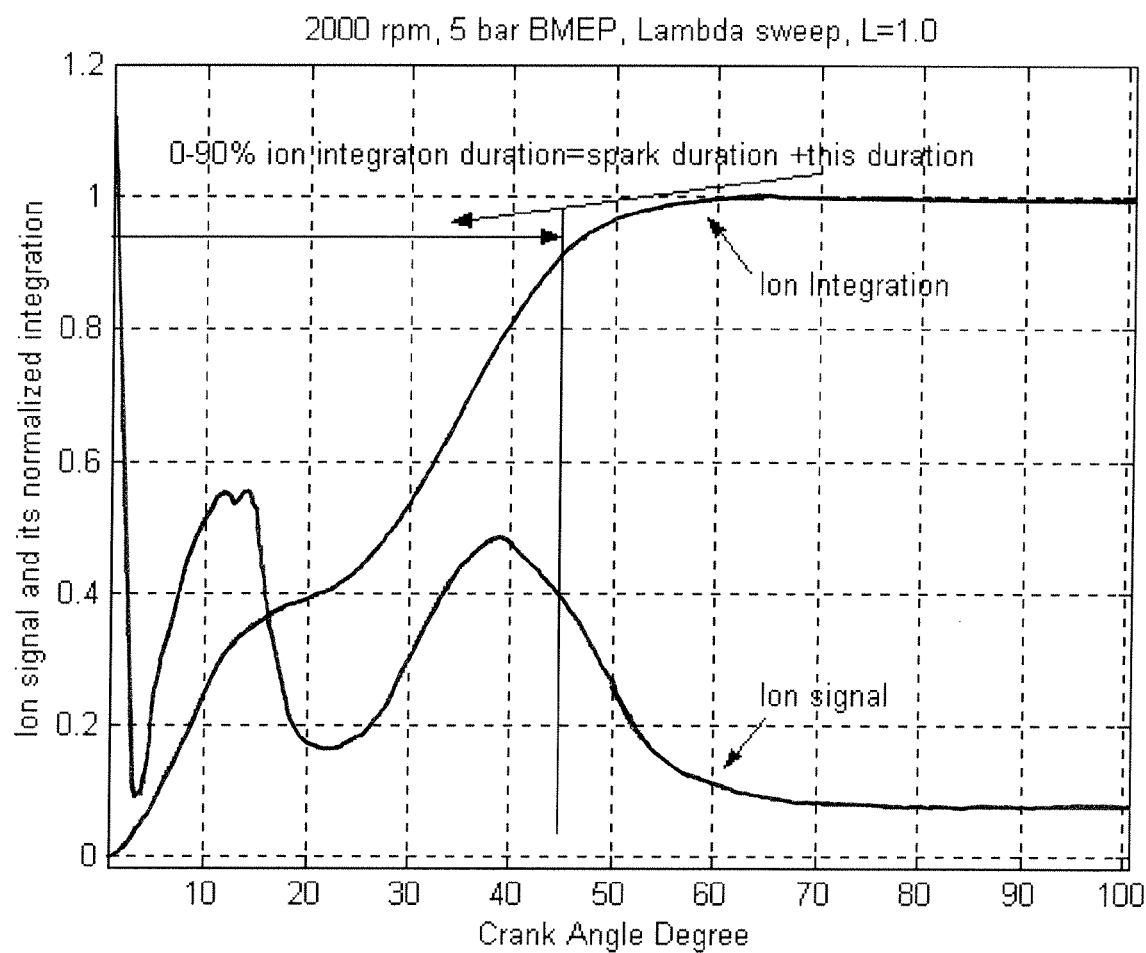
FIG. 3 illustrates a plot of integration over crank angle of an ionization signal in a spark ignition engine.

Referring to FIG. 3, one useful criterion, the integration location/duration of the ionization signal, is shown. The integration location is defined as the crank angle at which a certain percentage (say 90%) of integrated ionization signal is reached. (This can also be thought of as a "duration" since the time during the cycle corresponds to a crank angle of rotation.) Importantly, this measure is independent of the ionization signal magnitude and is related only to the shape of the ionization signal, which makes this measure robust to the magnitude of ionization signal. FIG. 3 also shows an ionization signal with a regular combustion and its integration duration is at 45 crank degrees from the crank angle where the ignition (spark) completes.

Figure 4:
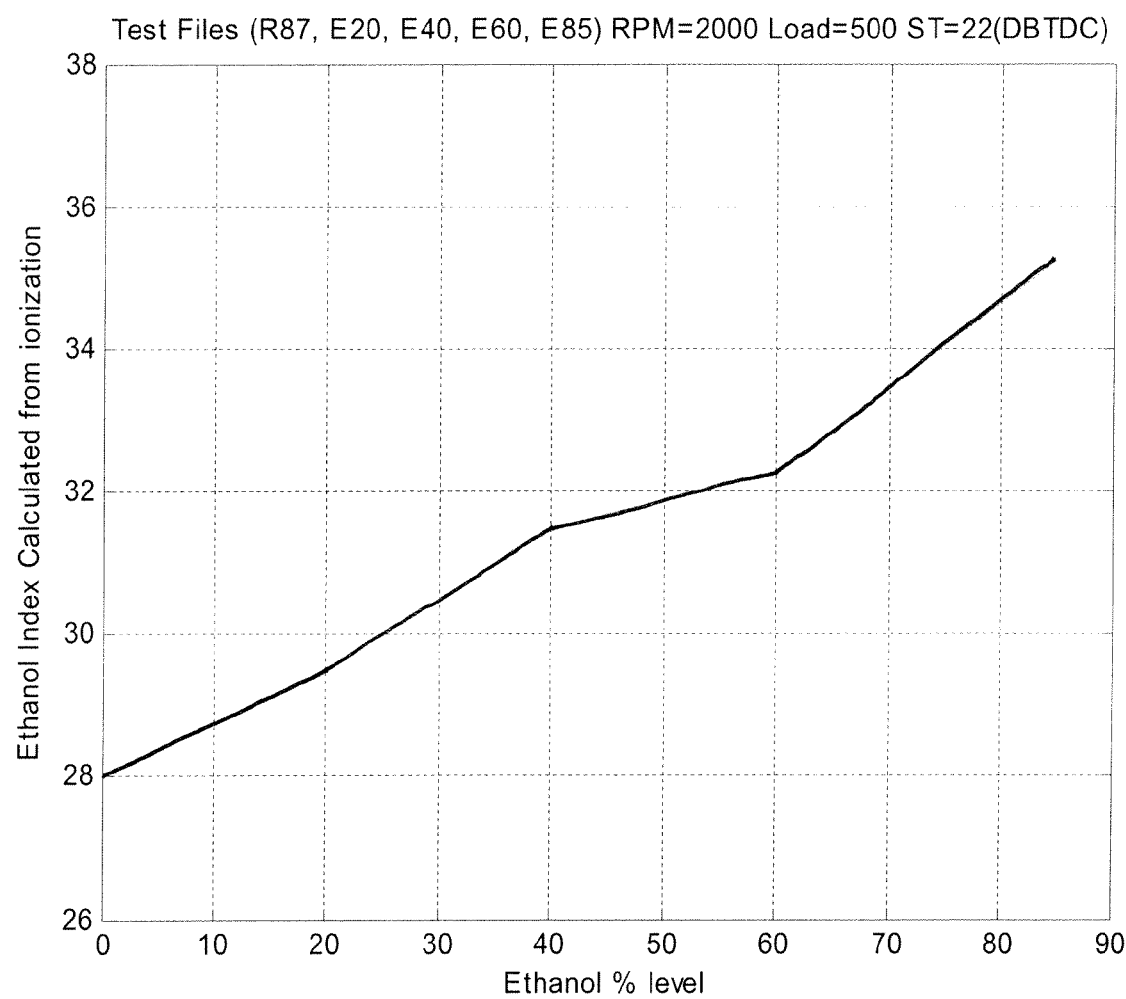
FIG. 4 illustrates a plot of the relationship between integration location and ethanol level for a first example.

Referring to FIG. 4, the correlation between the calculated ionization integration location and the fuel alcohol concentration level is shown for a first example. The data was obtained from a 5.4 L V8 engine operated at 2000 RPM with 5.0 bar IMEP load at a fixed ignition timing of 22 degrees before TDC. The relationship between integration location and fuel alcohol concentration is almost linear.

Figure 5:
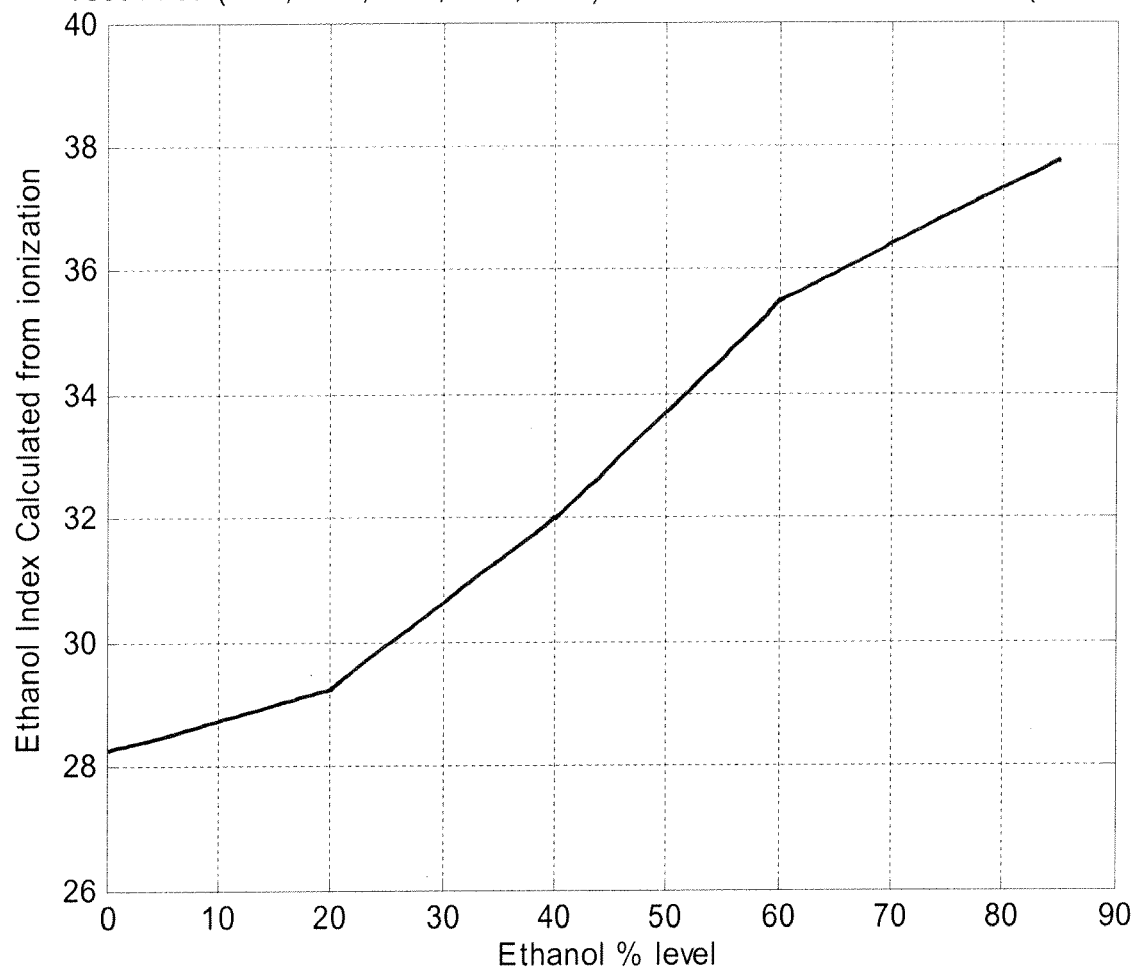
FIG. 5 illustrates a plot of the relationship between integration location and ethanol level for a second example.

Referring to FIG. 5, the correlation between the calculated ionization integration location and the fuel alcohol concentration level is shown for a second example. The correlation shown in FIG. 5 shows a nearly linear relationship similar to that of the first example. The data for the second example is taken from the engine operated at a different condition (1500 RPM with 2.62 bar IMEP load and ignition timing at 32 degrees before TDC). These examples illustrate that the integration location criterion is useful to estimate the alcohol concentration of the fuel, and thus is also useful as a virtual flex fuel sensor.

Figure 6:
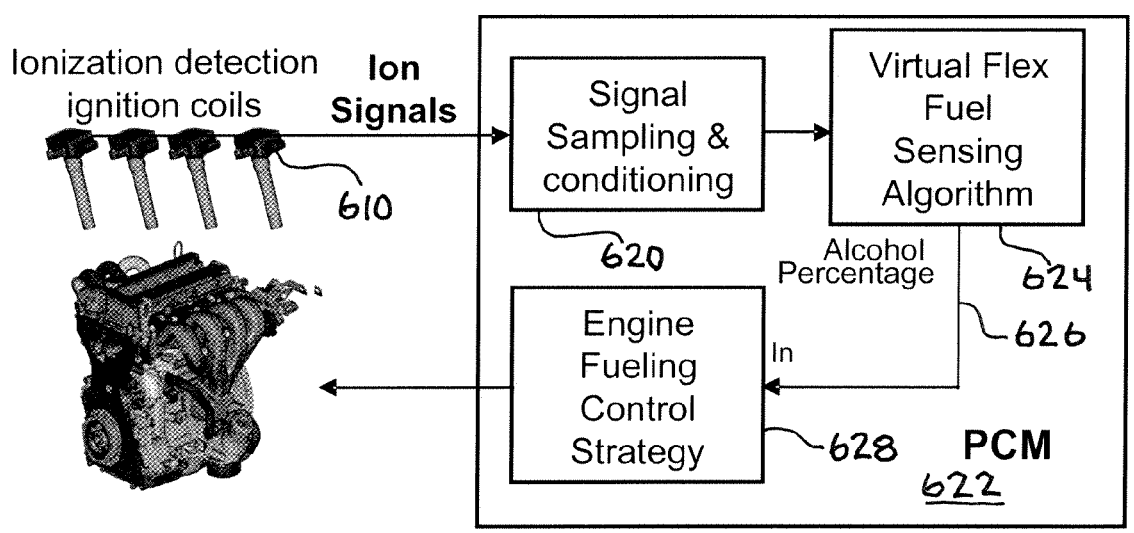
FIG. 6 illustrates a conceptual diagram of an ionization virtual flex fuel sensing system.

According to the various embodiments, the alcohol concentration level of flex fuel is estimated using the integration location of the in-cylinder ionization signals. Referring to FIG. 6, a system architecture of an ionization based virtual flex fuel sensor is shown. The ionization detection element is integrated into the ignition coil 610 of an engine and individual ionization signals are sampled and conditioned 620 by a Powertrain Control Module (PCM) 622. A virtual flex fuel sensing algorithm 624 instantiated in the PCM 622 calculates an estimate 626 of the alcohol concentration level of the flex fuel based upon the ionization integration locations. The estimate value 626 is fed into the engine fueling control strategy 628 (also operating within the PCM 622) that provides fueling command (quantity and timing) to the engine.

Figure 7:
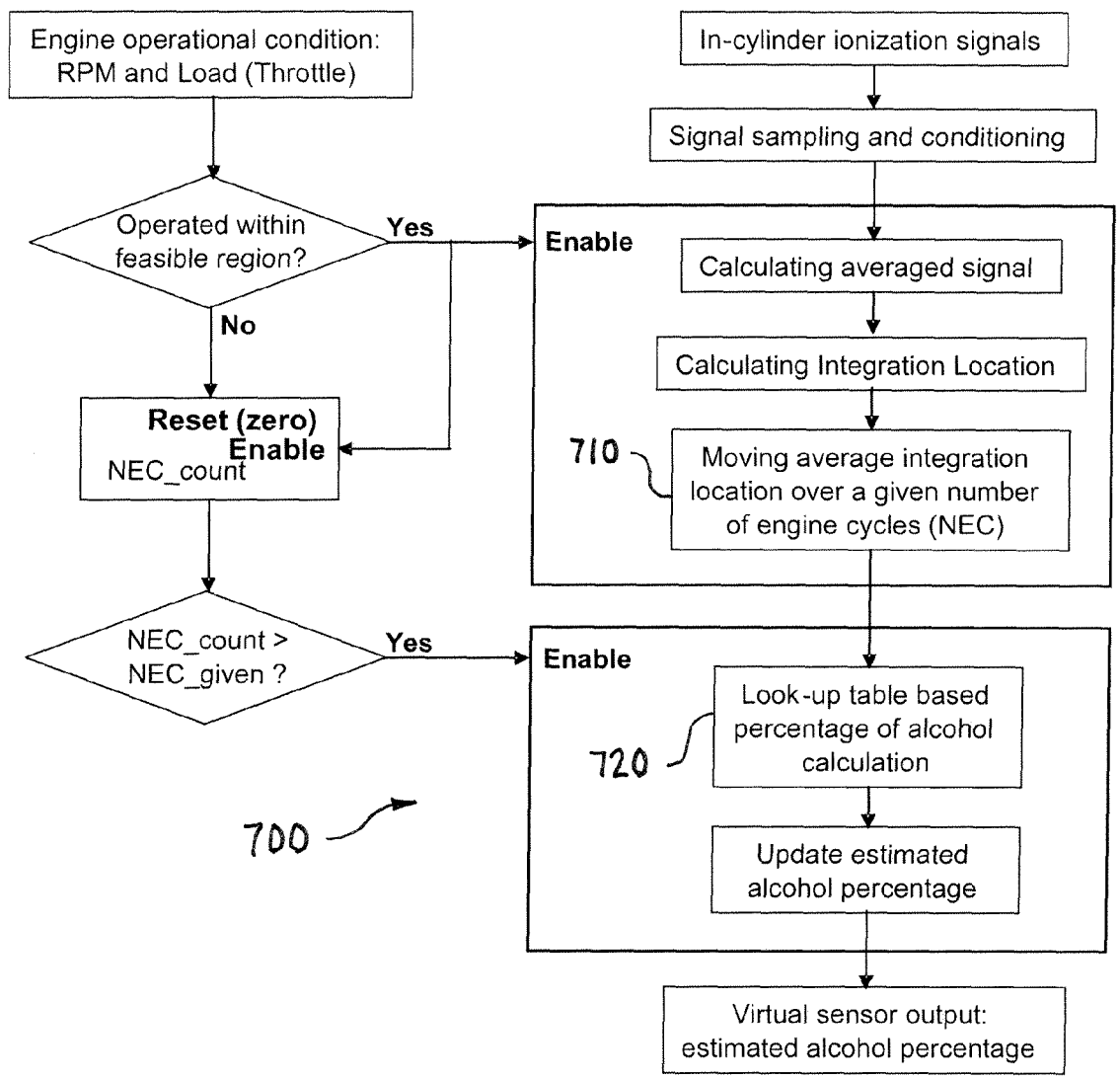
FIG. 7 illustrates a flow chart of a virtual flex fuel sensor algorithm according to a first embodiment of the present invention.
Figure 8:
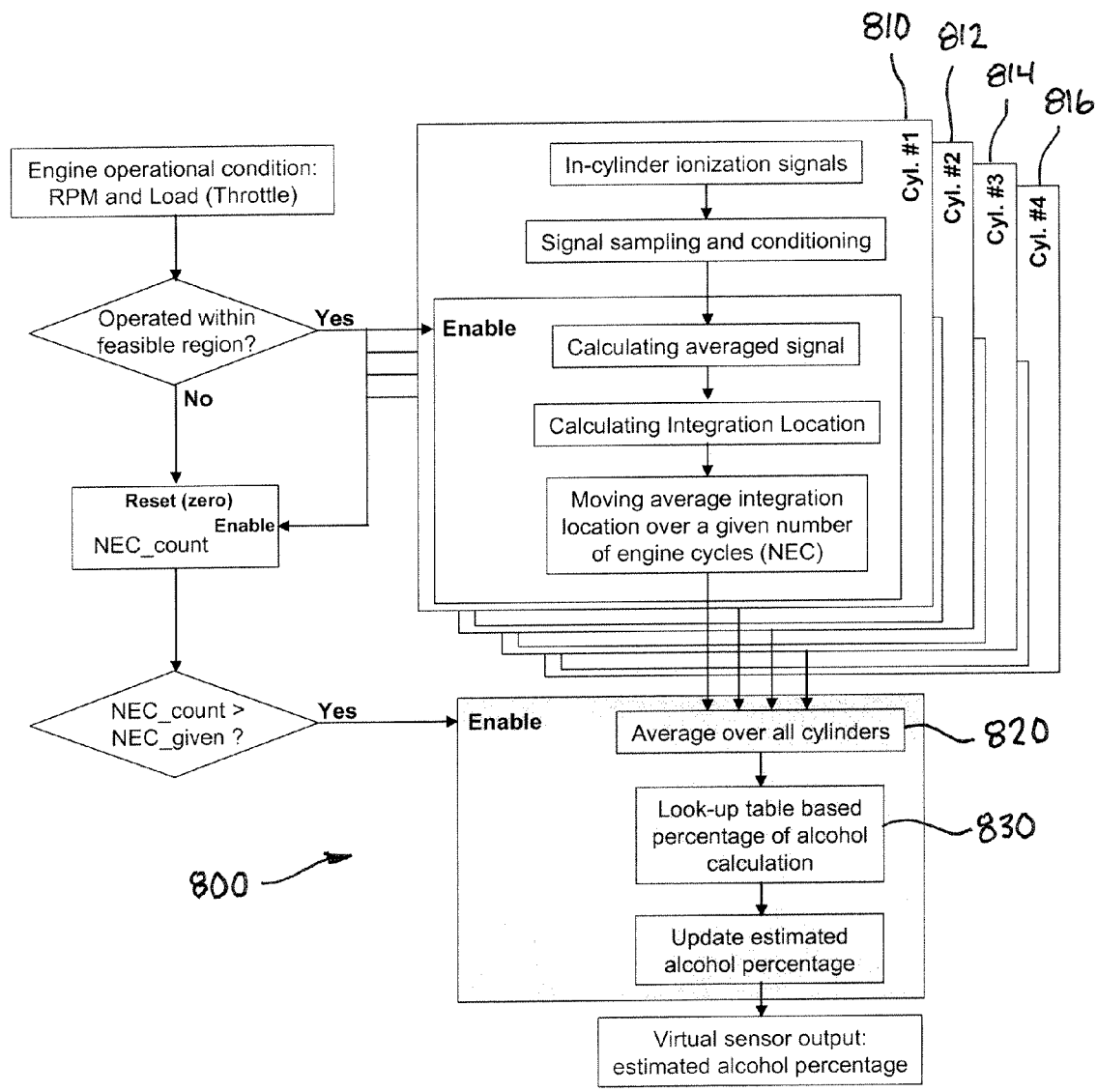
FIG. 8 illustrates a flow chart of a virtual flex fuel sensor algorithm according to a second embodiment of the present invention.

Two virtual flex fuel sensing algorithms are illustrated in FIGS. 7 and 8. FIG. 7 shows an algorithm 700 that calculates a single moving average 710 of the flex fuel index (integration location) for all cylinders and uses the moving average to determine 720 the percentage alcohol contained in the fuel. FIG. 8 shows an algorithm 800 that calculates moving averages 810, 812, 814, 816 of the flex fuel index (integration location) for individual cylinders and use the mean 820 of the moving averages to determine 830 the percentage alcohol contained in the fuel.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method for determining alcohol percentage of fuel in an internal combustion engine, the method comprising:
   obtain integration location values for each ignition event for all cylinders of the engine, each integration location value being obtained by:
      obtaining an in-cylinder ionization signal,
      integrating the obtained in-cylinder ionization signal with respect to crank angle, and
      identifying as the integration location value a crank angle value, measured relative to an ignition crank angle for a respective ignition event, at which a predetermined percentage of unity integration of the obtained ionization signal is achieved;
   calculating a single moving average of the obtained integration location values; and
   determining an estimate of percentage alcohol contained in the fuel based upon the moving average.

2. The method for determining fuel mix of claim 1, wherein the predetermined percentage of unity integration is 90 percent.

3. A method for determining fuel mix in an internal combustion engine, the method comprising:
   obtain first cylinder integration location values for each ignition event for a first cylinder of the engine, each first cylinder integration location value being obtained by:
      obtaining an in-cylinder ionization signal from the first cylinder,
      integrating the obtained first cylinder in-cylinder ionization signal with respect to crank angle, and
      identifying as the first cylinder integration location value a crank angle value, measured relative to an ignition crank angle for a respective ignition event, at which a predetermined percentage of unity integration of the obtained first cylinder ionization signal is achieved;
   calculating a first cylinder moving average of the obtained first cylinder integration location values;

obtain second cylinder integration location values for each ignition event for a second cylinder of the engine, each second cylinder integration location value being obtained by:
  obtaining an in-cylinder ionization signal from the second cylinder,
  integrating the obtained second cylinder in-cylinder ionization signal with respect to crank angle, and
  identifying as the second cylinder integration location value a crank angle value, measured relative to an ignition crank angle for a respective ignition event, at which the predetermined percentage of unity integration of the obtained second cylinder ionization signal is achieved;

calculating a second cylinder moving average of the obtained second cylinder integration location values;

calculating as a mean index the mean of the first and second moving averages; and determining an estimate of percentage alcohol contained in the fuel based upon the mean index.

4. The method for determining fuel mix of claim 3, wherein the predetermined percentage of unity integration is 90 percent.

* * * * *